United States Patent [19]

Urata

[11] 4,350,426
[45] Sep. 21, 1982

[54] TIME DETERMINATION CIRCUIT FOR CAMERA

[75] Inventor: Shinji Urata, Tachikawa, Japan

[73] Assignee: Asahi Kogaku Kogyo Kabushiki Kaisha, Tokyo, Japan

[21] Appl. No.: 240,423

[22] Filed: Mar. 4, 1981

[30] Foreign Application Priority Data

Mar. 12, 1980 [JP] Japan .............................. 55-32412[U]

[51] Int. Cl.³ .............................................. G03B 7/26
[52] U.S. Cl. ...................................... 354/234; 354/51
[58] Field of Search ................. 354/50, 51, 60 R, 234, 354/235, 238, 258, 266; 361/194–196; 307/592, 598, 599

[56] References Cited

U.S. PATENT DOCUMENTS 3,810,228  5/1974  Taguchi et al. ................. 354/258 X

*Primary Examiner*—L. T. Hix
*Assistant Examiner*—William B. Perkey
*Attorney, Agent, or Firm*—Sughrue, Mion, Zinn, Macpeak & Seas

[57] ABSTRACT

A time determination circuit for an automatic or manual exposure camera in which a single capacitor is utilized for both a power maintaining time determination circuit and a shutter controlling time determination circuit to thereby significantly reduce the space required for the electronics in the camera and thereby reducing the cost. The single capacitor is charged either through a constant current source controlled by an electromagnet switch which is in turn operated in response to raising of the camera mirror or through a transistor operated in response to a shutter time calculation circuit. A terminal voltage of the capacitor is compared with a fixed voltage and the comparison output is amplified to control an electromagnet.

6 Claims, 3 Drawing Figures

TIME DETERMINATION CIRCUIT FOR CAMERA

BACKGROUND OF THE INVENTION

The present invention relates to time determination circuits for cameras such as automatic exposure cameras. More particularly, the invention relates to a power maintaining time determination circuit.

A conventional power maintaining time determination circuit is so designed that the power is maintained on for twenty to thirty seconds after the photographer has depressed the release button halfway to turn on the power switch to thereby use the available battery power conservatively. During this period, the photographer determines the exposure, focusing and the composition conditions after which he operates the shutter release. The power maintaining time determination circuit is provided independently of other circuits such as the shutter control circuit and the display circuit.

The conventional power maintaining time determination circuit is disadvantageous in that if the photographing operation is completed prior to the expiration of twenty to thirty seconds, the circuit still maintains the power on even though it is no longer needed thereby wasting battery energy. Moreover, as the power maintaining time determination circuit is provided separately from other circuits as described above, the number of components needed for the electronics in the camera is great and it is difficult to economically use the limited space in the camera which results in a high manufacturing cost. It is difficult to provide a capacitor for time determination in the form of an integrated circuit even using present IC techniques. Accordingly, the conventional time determination circuit suffers from problems which cannot be solved through known IC techniques.

SUMMARY OF THE INVENTION

In order to eliminate the above-described difficulties accompanying a conventional time determination circuit, according to the invention, the power maintaining time determination circuit is included in the conventional shutter control circuit and the capacitor of the shutter control circuit is also used for the power maintaining time determination circuit.

More specifically, the invention provides a time determination circuit for either automatic or manually exposure camera including a power maintaining time determination circuit and a shutter controlling time determination circuit. A single capacitor is shared between the two time determination circuits thereby reducing the amount of space required for the electronics in the camera. The single capacitor is charged either through a constant current source coupled in series with an electromagnetic switch or through a transistor operated in response to a shutter time calculation circuit. A terminal voltage of the capacitor is compared with a fixed voltage by a comparator circuit. An electromagnet is operated in response to a comparison output of the comparator circuit. A bipolar transistor is coupled across a power switch controlling the full of output power from the battery of the camera. The transistor is maintained in the on state even when the switch is opened for a predetermined time after the shutter button of the camera has been pressed halfway. Once the shutter button is depressed all the way to actually activate the shutter for the photographing operation, the power flow is terminated.

DESCRIPTION OF THE PREFERRED EMBODIMENTS

A preferred embodiment of the invention will be described with reference to the accompanying drawings.

Figure 1:
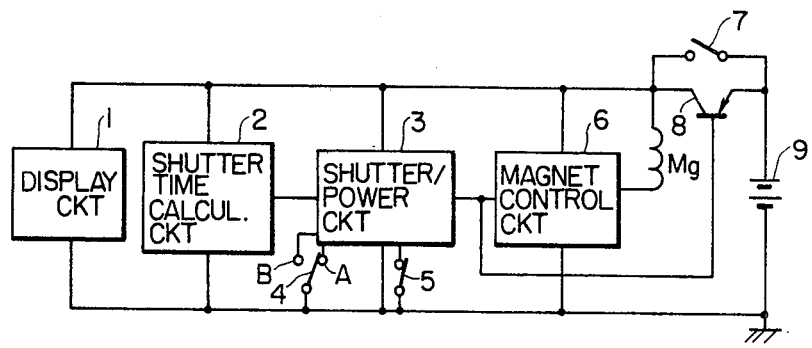
FIG. 1 is a block diagram showing the entire electric circuit of an automatic exposure camera.

FIG. 1 is a block diagram showing the entire electric circuit of an automatic exposure camera according to the invention. The electric circuit, as shown in FIG. 1, includes a display circuit 1, a shutter time calculating circuit 2, a shutter controlling and power maintaining time determination circuit 3, an electromagnet switch 4, a timing switch 5, an electromagnet controlling circuit 6, a power switch 7, a transistor 8, a power source 9, and an electromagnet Mg.

Figure 2:
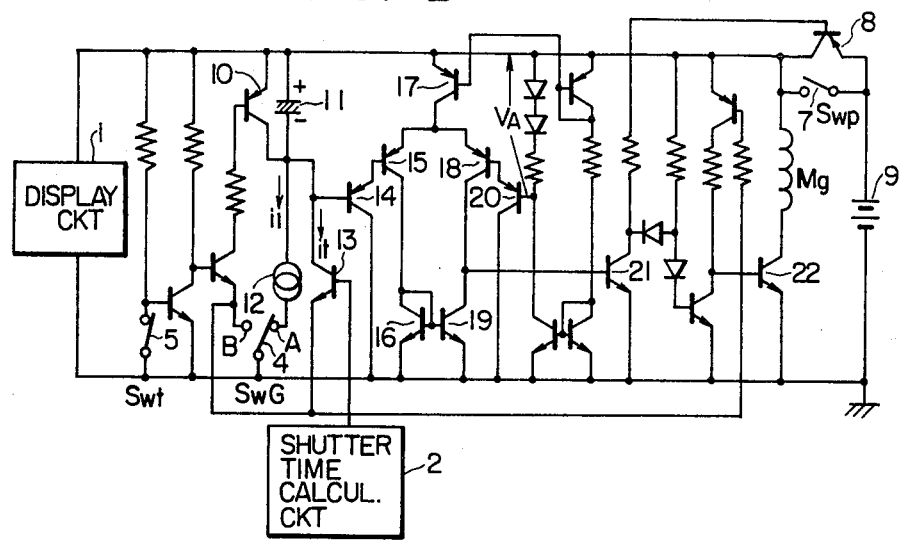
FIG. 2 is a detailed circuit diagram showing a time determination circuit section according to preferred embodiment of the invention.

FIG. 2 is a circuit diagram showing the circuit of FIG. 1 in more detail and specifically showing the details of the time determination circuit of the invention which includes the circuits 2 and 3 in FIG. 1. As shown in FIG. 2, the positive terminal of a capacitor 11 is connected to the positive terminal of a power source 9 and the negative terminal of the capacitor 11 is connected to the collector of a charging transistor 13. The junction point of the negative terminal of the capacitor 11 and the collector of the charging transistor 13 is connected to the base of a transistor 14 which is the negative input terminal of a comparator circuit composed of transistors 14 through 21 thus forming a shutter controlling time determination circuit. A constant voltage $V_A$ is applied to the other input terminal of the comparator circuit. The junction point of the capacitor 11, the collector of the transistor 13 and the base of the transistor 14 is connected to one terminal of a power maintaining charging constant current source 12. The other terminal of the charging constant current source 12 is connected to one contact A of the electromagnet switch 4 the other contact B of which is connected to the emitter of the charging transistor 13. The armature of the electromagnet switch 4 is connected to ground. Using a technique well known in the art, the armature of the electromagnet switch 4 is tripped from the contact A to the contact B when the mirror (not shown) is raised.

Figure 3:
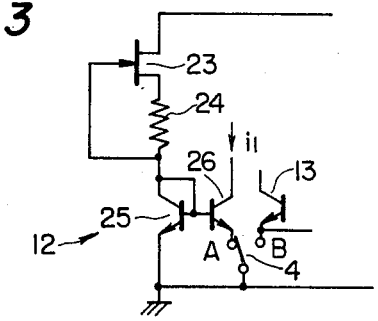
FIG. 3 is an electric circuit diagram showing a charging constant current circuit in FIG. 2 in more detail.

The charging constant current source 12 in FIG. 2 is shown in FIG. 3 in more detail. In FIG. 3, reference numeral 23 designates a field-effect transistor (FET) which is biased through a resistor 24 and transistors 25 and 26. The transistor 26 performs the charging constant current source function through a current mirror effect with the transistor 25.

With respect to the power maintaining operation with the circuit thus constructed, upon first turning on the power switch, the voltage at the negative terminal of the capacitor 11 is at the positive voltage of the power source as a result of which the output state of the comparator composed of the transistors 14 through 21 is such that the transistor 21 is rendered conductive. Accordingly, the transistor 8 is also rendered conductive as a result of which, even after the lever of the power switch 7 is released, current is supplied to the circuit from the power source. For a period of time $t_1 = C_1 V_A / i_1$, where $i_1$ is the charging constant current, $C_1$ is the capacitance of the capacitor, and $V_A$ is the voltage between the power source and the base of the transistor 20, both the transistors 21 and 8 are maintained conductive to supply current to the circuit. After a period of $t_1$ after the power switch 7 was turned on, the output state of the comparator changes to render both of the transistors 21 and 8 non-conductive. If the power switch 7 has been turned off, the supply of current to the circuit is suspended. In this operation, the armature of the electromagnet switch 4 is set at the contact A in the case where no release operation has yet been conducted, and therefore the transistor 10 is non-conductive and there is no effect on the circuit operation. Accordingly, even if the power switch 7 is turned off immediately after being turned on, current is applied to the circuit for the predetermined period of time. In other words, if the release button is operated (depressed) with the finger only once, the finger may be released from the release button and it is unnecessary to continuously depress the release button to maintain the photometric conditions displayed in the viewfinder for the predetermined period of time.

According to the invention, the time determination circuit is additionally provided with the following function. The electromagnet switch 4 is driven upon depression of the release button to trip the armature from the contact A to the contact B. When the armature of the electromagnet switch 4 is tripped to the contact B, the transistor 10 is rendered conductive. As a result, as in the above-described case, the output of the comparator then changes so that the transistor 22 is rendered conductive to supply current to the electromagnet Mg. On the other hand, when the timing switch 5 operated in synchronization with the start of the top curtain is turned off, the capacitor 11 is charged by the collector current $i_t$ of the charging transistor 13 which is controlled by the shutter time calculating circuit. In this case, the armature of the electromagnet switch 4 has been tripped over to the contact B and therefore the charging constant current $i_1$ is prevented from flowing from the charging constant current source 12. Therefore, the shutter time $t_2$ is determined from $C_1 V_A / i_t$. That is, after a period of time $t_2$ after the timing switch 5 has been turned off, the output of the comparator changes to suspend the current supply to the electromagnet Mg. Then the bottom curtain is run thus completing the exposure operation. If, in this case, the power switch 7 is maintained turned off, then current is supplied to the circuit. However, if the exposure is accomplished by operation of the shutter during the predetermined period of time that the power is maintained on with the power switch 7 turned off, the current supply is suspended because the output state of the comparator changes, that is, the transistor 8 is non-conductive.

As is apparent from the above description, the shutter controlling capacitor is also used as the capacitor in the power maintaining time determination circuit. Also, the power maintaining function is cancelled whenever a photographing operation is completed which eliminates unnecessary and undesirable power consumption. Furthermore, only one capacitor is used in the time determination circuit of the invention. This is advantageous in the economical use of space. In addition, the use of only one capacitor contributes significantly to a reduction of the manufacturing cost of the camera.

What is claimed is:

1. A time determination circuit for a camera comprising: power maintaining time determination circuit means for supplying operating power to exposure conditions determining means prior to a shutter opening operation; shutter controlling time determination circuit means; and a single capacitor coupled as a time determination capacitor to both said power maintaining time determination circuit means and said shutter controlling time determination circuit means.

2. A time determination circuit for a camera comprising: first circuit means for maintaining activation of an electromagnet indicative of exposure conditions for a predetermined period of time in response to partially pushing a shutter button; and second circuit means for terminating operation of said electromagnet immediately upon complete pressing of said shutter button during said predetermined period of time.

3. The time determination circuit of claim 2 wherein said first and second circuit means share a single timing capacitor.

4. A time determination circuit for a camera comprising: a power switch coupled in series with a power source; a first transistor coupled in parallel with said power switch; an electromagnet switch having an armature connected to a ground terminal of said power source; a charging capacitor having a first terminal coupled to said power source through said power switch; a constant current source, a second terminal of said capacitor being coupled through said constant current source to a first contact of said electromagnet switch; circuit means for discharging said capacitor, said discharge circuit means being coupled to a second contact of said electromagnet switch; comparator circuit means having a first input terminal coupled to said second terminal of said capacitor and a second input terminal coupled to a source of a constant voltage; a second transistor operatively coupled for conducting current between said second terminal of said capacitor in said second contact of said electromagnet switch in response to an output from a shutter time determining circuit; an electromagnet; and means for driving said electromagnet in response to an output of said comparator circuit means.

5. The time determination circuit of claim 4 wherein said constant current source means comprises a field-effect transistor having one of source and drain terminals coupled to said first terminal of said capacitor; a resistor having a first terminal coupled to the other of said source and drain terminals of said field-effect transistor, a gate terminal of said field-effect transistor being coupled to a second terminal of said resistor; a first bipolar transistor having a collector and a base coupled to said second terminal of said resistor and an emitter terminal coupled to said ground; and a second bipolar transistor having a base coupled to said collector and base of said first bipolar transistor, an emitter coupled to said first contact of said electromagnet switch and a collector coupled to said second terminal of said capacitor.

6. The time determination circuit of claim 5 wherein said circuit means for discharging said capacitor comprises a third bipolar transistor having emitter and collector terminals coupled across said capacitor; a fourth bipolar transistor having collector and emitter terminals coupled in series between a base of said third bipolar transistor and said second contact of said electromagnet switch; a fifth bipolar transistor having a collector and emitter coupled in series between a base of said fourth bipolar transistor and said ground; a resistor coupled between said first terminal of said capacitor and said base of said fourth bipolar transistor; and a timing switch coupled between a base of said fifth bipolar transistor and said ground.

* * * * *